United States Patent
Chase et al.

(10) Patent No.: US 7,460,328 B2
(45) Date of Patent: Dec. 2, 2008

(54) COMPENSATION FOR VARIABLE SERVO TRACK WIDTH

(75) Inventors: Scott E. Chase, South Ogden, UT (US);
Daniel D. Rochat, Ogden, UT (US);
Lawrence Moon, Layton, UT (US);
Gregory M. Allen, Layton, UT (US)

(73) Assignee: Iomega Corporation, San Diego, CA (US)

( * ) Notice: Subject to any disclaimer, the term of this patent is extended or adjusted under 35 U.S.C. 154(b) by 180 days.

(21) Appl. No.: 11/478,245

(22) Filed: Jun. 29, 2006

(65) Prior Publication Data
US 2008/0002283 A1    Jan. 3, 2008

(51) Int. Cl.
*G11B 21/02*    (2006.01)
*G11B 5/596*    (2006.01)

(52) U.S. Cl. .................... 360/75; 360/77.08

(58) Field of Classification Search .............. None
See application file for complete search history.

(56) References Cited

U.S. PATENT DOCUMENTS 6,091,566 A * 7/2000 Matsui et al. .......... 360/77.04
7,271,977 B1 * 9/2007 Melrose et al. ........ 360/77.04

* cited by examiner

*Primary Examiner*—Andrew L. Sniezek
(74) *Attorney, Agent, or Firm*—Stephen C. Beuerle; Procopio Cory Hargreaves & Savitch

(57) ABSTRACT

A track map of a disk drive is generated to compensate for various conditions. A track map is a stored measurement of every "half" servo track width on a disk. Every servo half track width is measured in the factory on a disk and then the data is stored on the disk for use during drive operations. When an individual track is accessed, the appropriate servo half track width data is pulled from memory and is used to adjust a scale factor for that local half track width. The track map may be used to compensate for various conditions including varying servo track width, microjog distance, and data track spacing.

20 Claims, 19 Drawing Sheets

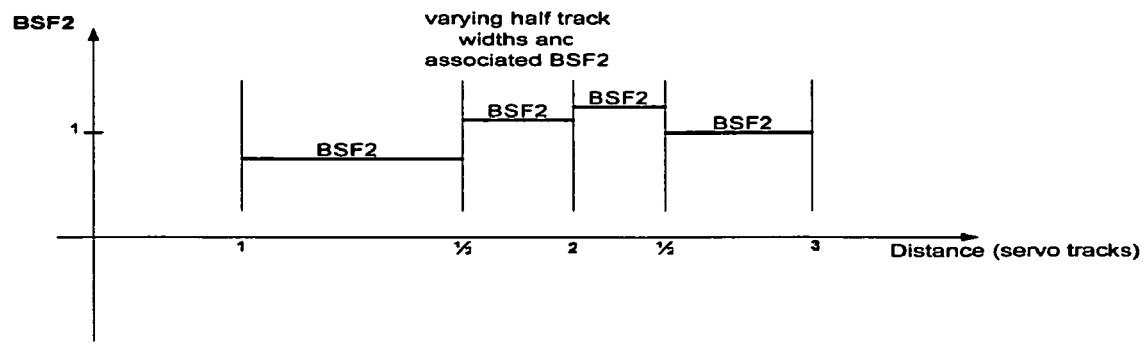
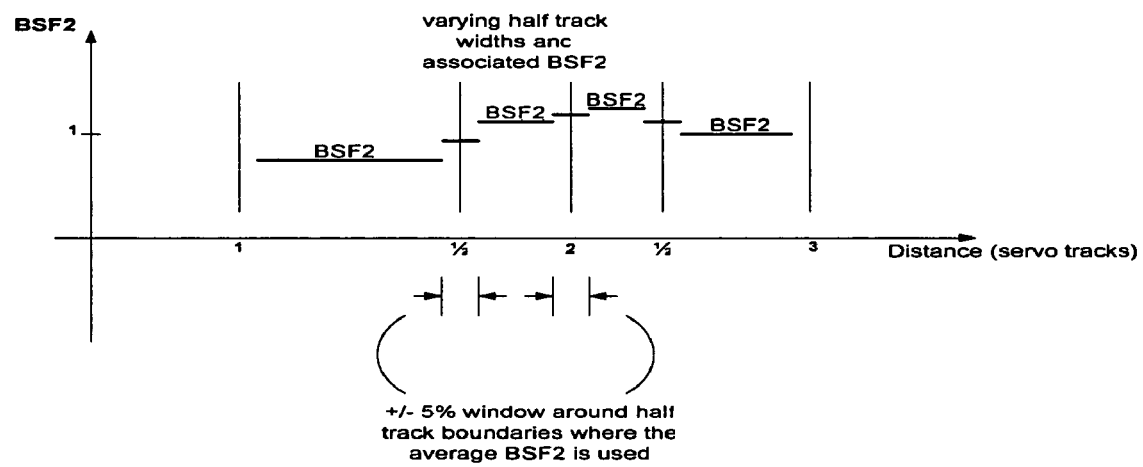
Figure 16

**Nominally Spaced
Servo and Data Tracks**

Write element placed over data track center by positioning the GMR reader
½ servo track away. Notice the micro-jog distance = ½ servo track!

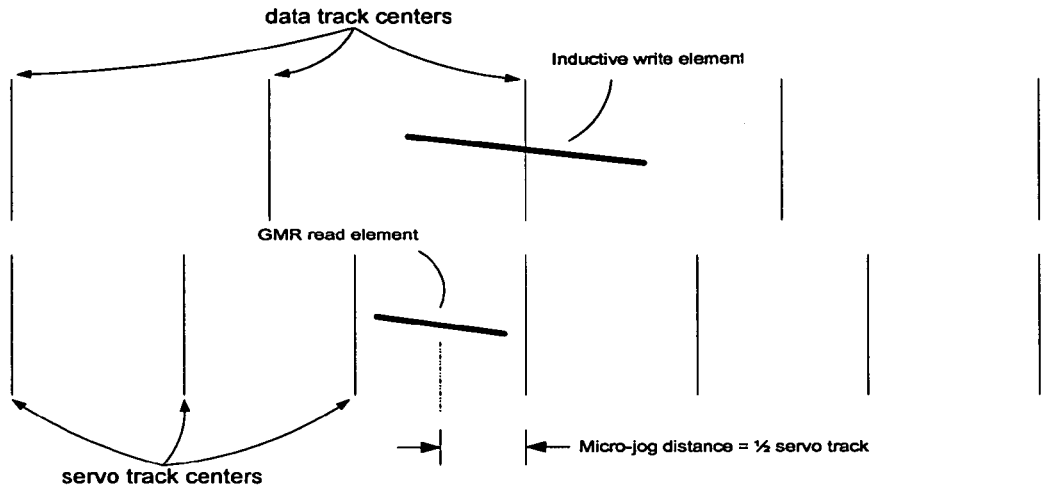

**Varying Servo and
Data Track Widths**

Write element NOT placed over data track center by positioning the GMR
reader ½ servo track away. Notice the micro-jog distance is still ½ servo
track, but the servo track used is narrow!

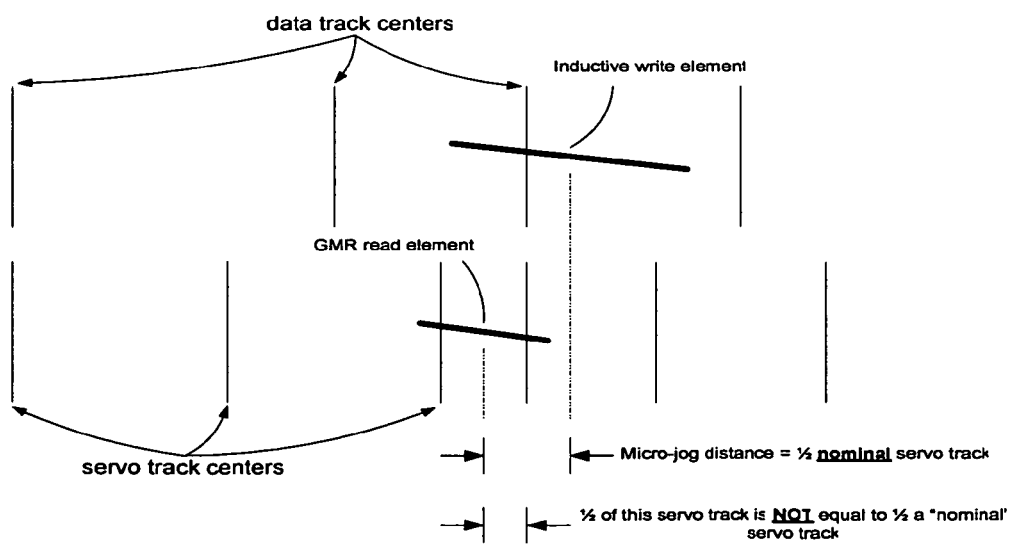

Figure 18

Varying Servo and Data Track Widths

Write element NOT placed over data track center by positioning the GMR reader ½ servo track away. Notice the micro-jog distance is still ½ servo track, but the servo track used is narrow

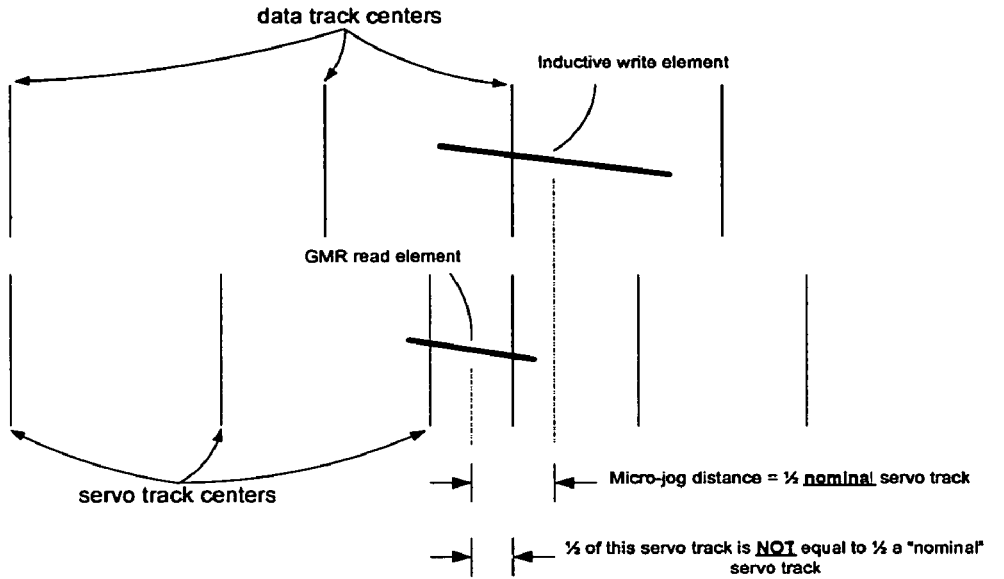

Varying Servo and Data Track Widths with Track Map Correction

Write element placed over data track center by positioning the GMR reader 1 servo track away. The track map information adjusted the micro-jog distance with the knowledge that the head is spanning a narrow servo track!

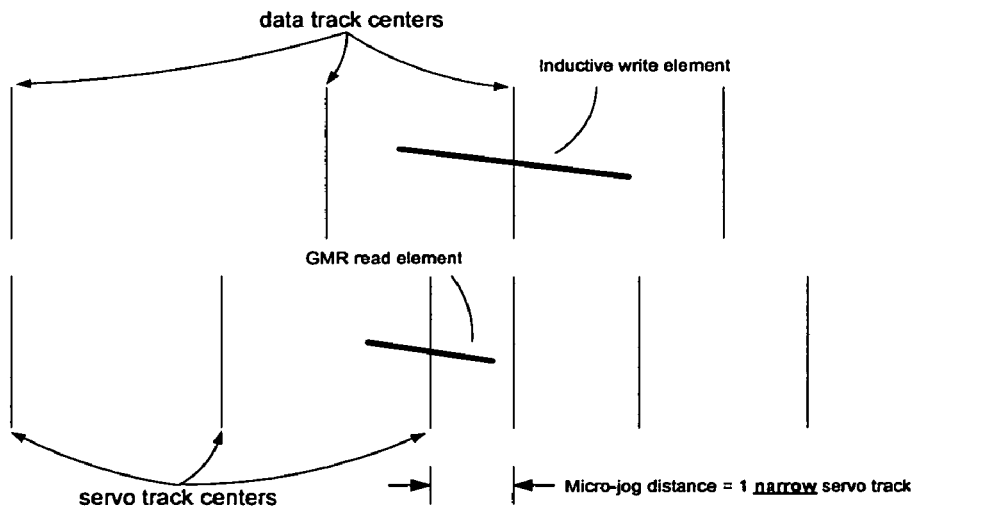

Figure 19

Varying Servo and Data Track Widths
Without use of the track map, the data track spacing is affected by the varying servo track spacing. One data track every 3 servo half tracks.
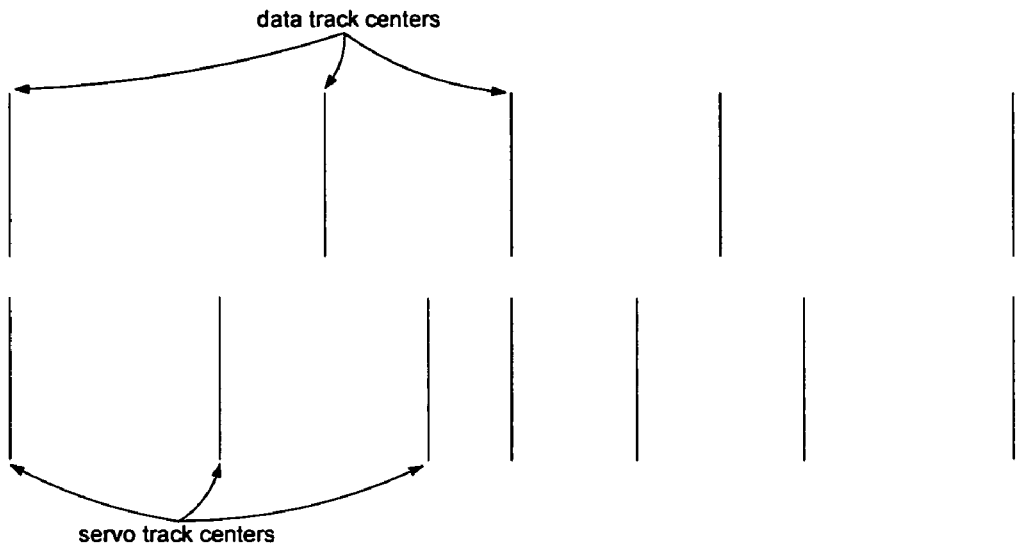
Data track spacing corrected with use of the track map
Using the track map, the data track centers can be defined as any servo track position creating evenly spaced data tracks
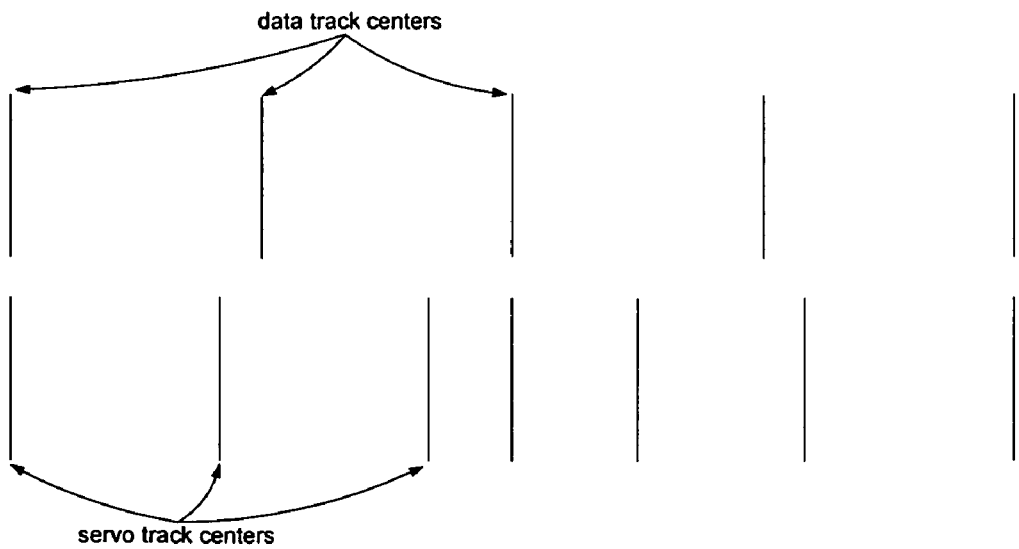
Figure 20

COMPENSATION FOR VARIABLE SERVO TRACK WIDTH

TECHNICAL FIELD

This invention relates to computer storage products, and more particularly to compensation for variable servo track width in removable data cartridges.

BACKGROUND

Over the past twenty years, computer technology has evolved very rapidly. One aspect of this evolution has been a progressively growing demand for increased storage capacity in memory devices. In order to provide a high storage density at a reasonable cost, one of the most enduring techniques has been to provide a rotatable hard disk with a layer of magnetic material thereon, and a read/write head which is supported for movement adjacent the disk and can transfer information to and from the disk.

Early disk drives included a read/write head having a single read/write element, which was used both for writing data and reading data. However, there has been a progressively increasing demand for disk drives with significantly higher storage densities, and one result is that new types of heads have come into common use, examples of which include the magneto-resistive (MR) head, and the giant magneto-resistive (GMR) head. These MR and GMR heads typically have one element for writing data and a separate element for reading data, and these read and write elements are physically spaced from each other.

As is known in the art, a head can be positioned with respect to a disk by using feedback control based on servo information read from the disk with a read element of the head. In a head with spaced read and write elements, the read element is used to position the head relative to the disk not only for reading, but also for writing. One aspect of this is that, as the head is moved relative to the disk, the orientation of the read and write elements varies with respect to the tracks on the disk, such that the write element is typically aligned with a track that is different from the track with which the read element is aligned. Consequently, in order to correctly position the write element over a selected track for the purpose of writing data to that track, the read element must be positioned at a location which is radially offset from the selected track. This radial offset is referred to as a "microjog", and has a magnitude which varies as the head moves radially with respect to the disk. Techniques have been developed for calculating microjog values, and have been generally adequate for their intended purposes, but they have not been satisfactory in all respects.

As one aspect of this, there are existing disk drives in which the disk is rotatably supported in a removable cartridge, and in which the head is movably supported in a drive unit that can removably receive the cartridge. A given drive unit must be able to work with any of several similar and interchangeable cartridges, and any given cartridge must be capable of working in any of a number of compatible drive units. The removability of the cartridge introduces a number of real-world considerations into the system, and these considerations affect the accurate calculation of a microjog value.

For example, the cartridges have manufacturing tolerances which vary from cartridge. Thus, from cartridge to cartridge, there will be some variation relative to the cartridge housing of the exact position of the axis of rotation of the disk. As another example, two different cartridges may have slightly different mechanical seatings when they are inserted into the same drive unit. In fact, a given cartridge may experience different mechanical seatings on two successive insertions into the same drive unit. Real-world variations of this type cause small variations in the orientation of the read/write head with respect to the tracks on the disk, and thus affect accurate calculation of a microjog value.

In order to realize higher data storage densities in systems of the type which utilize removable cartridges, it is desirable to be able to use read/write heads that facilitate high storage densities, especially read/write heads that have spaced read and write elements, such as MR and GMR heads. However, due to real-world considerations of the type discussed above, accurate calculation of a microjog value has presented problems in the context of a removable cartridge. Accordingly, existing systems that use removable cartridges have continued to use read/write heads with a single read/write element, with the consequence that the storage capacities are significantly less than the storage capacities desired by consumers.

Current magnetic recording devices use an inductive-write and GMR-read dual element head (FIG. 1). Due to head manufacturing limitations, the read and write elements are not necessarily aligned along a centerline.

In addition, most hard drives place the head on a rotary actuator. When the actuator rotates around its pivot to position the head over a particular track, the GMR reader and inductive writer can be several servo tracks apart due to the finite distance between them (FIG. 2).

Hard drives minimize the complications caused by this head and actuator geometry by positioning the reader at a servo track center and writing data wherever the writer happens to be. Adjacent tracks are written in the same manner. If the servo tracks are evenly spaced there should always be a constant distance between the centerlines of the written data (FIG. 3). The hard drive disk(s) can not be removed, so the read and write elements will always be the same. Knowledge of the reader to writer spacing and offset is required to accurately place the reader over the written data upon read back.

A removable hard disk drive such as the REV drive from Iomega Corporation uses the same dual element head, but allows the user to remove the disk from the drive. This means the data written on a given disk can come from multiple REV drives. Each drive has its own set of heads, and the separation and offset between the reader and writer can vary from head to head. Using the hard drive technique described above, which places the reader at the track center and writing data wherever the writer is, will not work because of this drive to drive variation. To ensure all REV drives can read and write any cartridge, the REV drive requires the writer to be placed over the data track center. This implies the head geometry for each drive has to be pre-determined. During data writes, the GMR reader is positioned wherever necessary so the data is always written down the data track center. All REV drives expect to find the data in the center of the defined data track.

FIG. 4 illustrates a typical servo and data track layout. Servo tracks are defined by writing specific patterns to the disk which are never overwritten. The reader width is designed to be narrower (~60%) than the writer. This allows the servo track pitch to be higher than the data track pitch. Ideally the servo tracks would be evenly spaced. Due to spindle motor runout, windage, vibration, temperature variations, etc., the servo tracks vary in width. Inaccuracies in the servo track widths can cause inaccuracies in positioning the GMR reader and inductive writer. Positioning inaccuracies ultimately cause two problems. The first is known as "data encroachment". Data encroachment occurs when the writer is positioned away from the data track center and overwrites part of the adjacent track data. This is catastrophic if the adjacent track data is unrecoverable. The second issue occurs during data read back. Since the data is expected to be on the data track center, the servo system will position the reader there first. If problems occur reading the data, the servo system will re-position the head at varying off track locations in an attempt to find it. This process takes time which affects the overall data throughput.

As described above, accurately positioning the reader and writer is important to successfully storing data without data encroachment, and efficiently reading that data back. Varying servo track widths cause position errors in two different ways. The first involves inaccuracies in generating a linear position error signal from the servo information written on the disk within a given servo track. The second comes from the fact that the GMR reader can be several servo tracks away from the inductive writer. This is the cumulative effect of many servo track widths in error. Since the writer needs to be positioned over a data track center, the reader to writer distance at a particular disk radius must be pre-determined. Using the servo tracks as the measuring tool, any inaccuracy in servo track width directly translates to writer positioning errors. What is needed is an efficient manner to compensate for these errors.

SUMMARY

A track map of a disk drive is generated to compensate for various conditions. A track map is a stored measurement of the average width of every "half" servo track on a disk. The average servo half track width is measured for all servo half tracks on a disk in the factory and then the data is stored on the disk for use during drive operations. When an individual track is accessed, the appropriate servo half track width data is pulled from memory and is used to adjust a scale factor for that local half track width. The track map may be used to compensate for various conditions including varying servo track width, microjog distance, and servo track spacing.

DESCRIPTION OF DRAWINGS

These and other features and advantages of the invention will become more apparent upon reading the following detailed description and upon reference to the accompanying drawings.

FIG. 16 shows the average BSF2 at half track boundaries.

FIG. 18 shows varying servo track widths causing microjog errors.

FIG. 19 illustrates the present invention correcting microjog errors with the track map.

FIG. 20 illustrates an adjusted data track layout using the track map.

DETAILED DESCRIPTION

Figure 5:
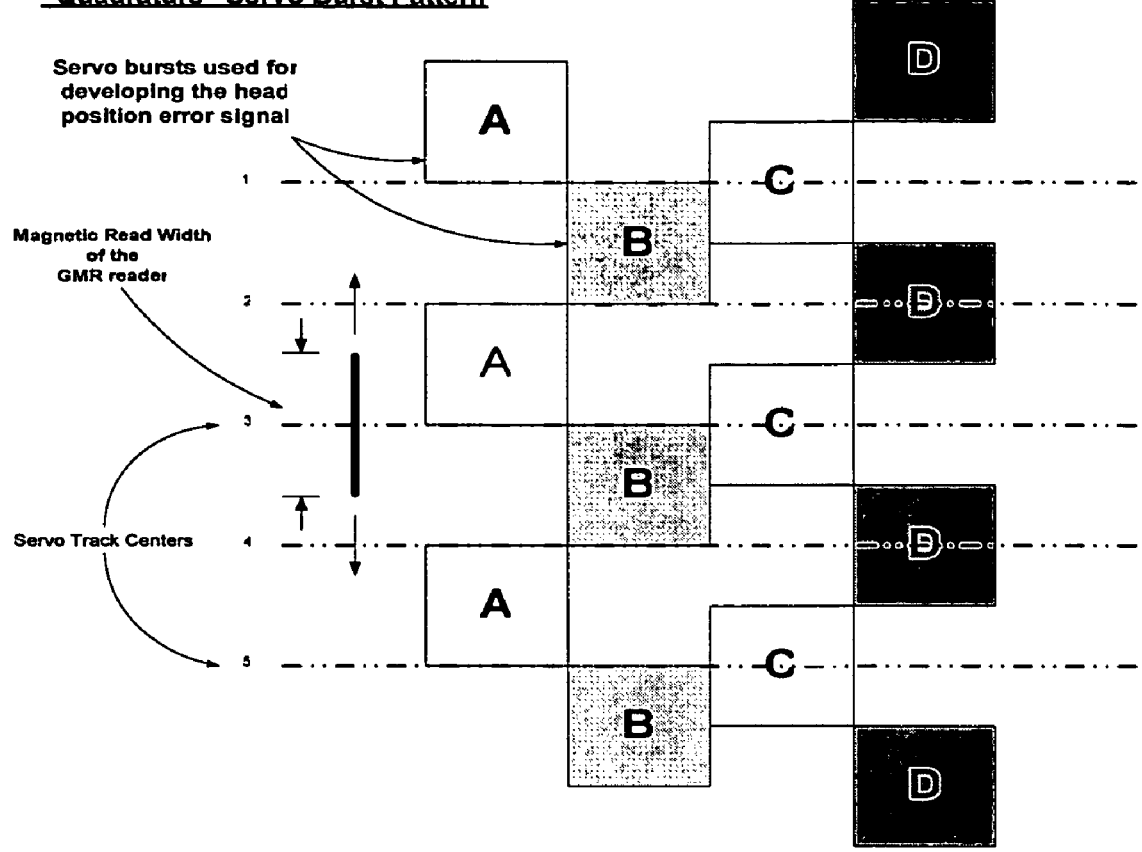
FIG. 5 shows a typical removable hard disk servo burst pattern.

To accurately position the GMR read element anywhere on a servo track, a linear error signal needs to be developed. This is accomplished using the servo patterns written on the disk. FIG. 5 is an example of the REV servo pattern. It consists of four bursts of information labeled A, B, C, and D. The read element has an effective read width known as the magnetic read width (MRW). This characteristic describes the physical distance over which the head senses magnetic fields. The read element senses the magnetic field of each burst as it passes underneath the head. The digital read channel chip, that receives the signal from the head, calculates the amplitude for each burst. The amplitude is represented in a ten bit word. The center of a servo track is defined to be where the amplitudes of A and B are equal. As the head moves away from the track center, the measured amplitudes of A, B, C, and D vary.

Figure 6:
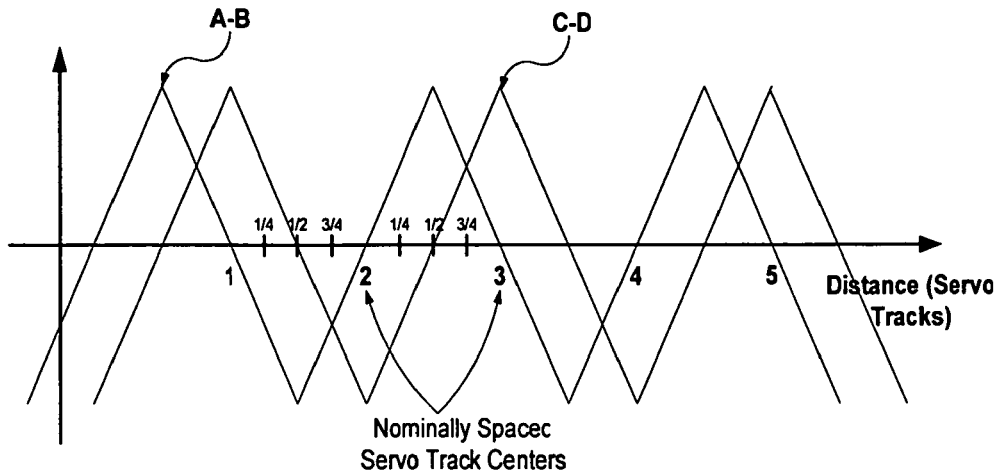
FIG. 6 illustrates an ideal Position Error Signal.
Figure 7:
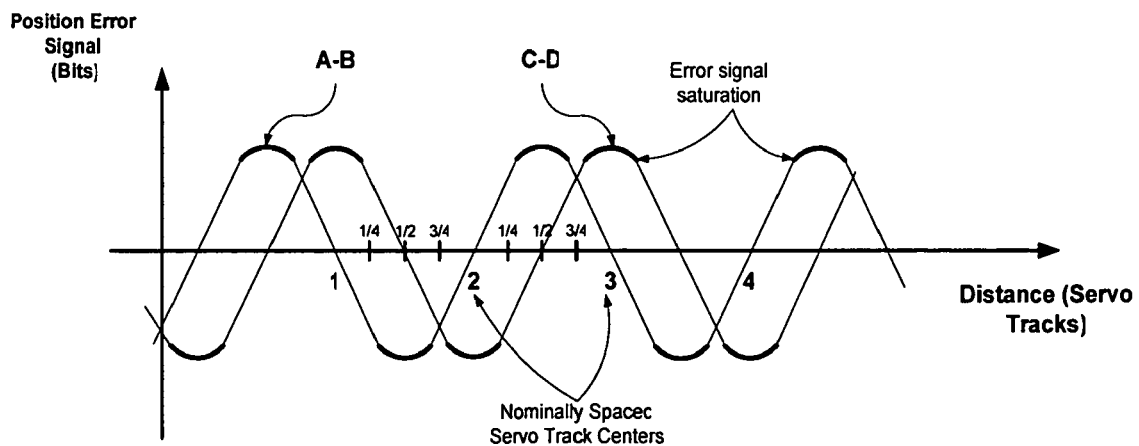
FIG. 7 shows the Position Error Signal saturation.

FIG. 6 illustrates an ideal position error signal generated as the head moves across several servo tracks. In reality the error signal begins to saturate just beyond the ¼ track as shown in FIG. 7. This is why the quadrature pattern is used. Notice as the A–B signal begins to saturate, the C–D signal is in its linear region.

Figure 8:
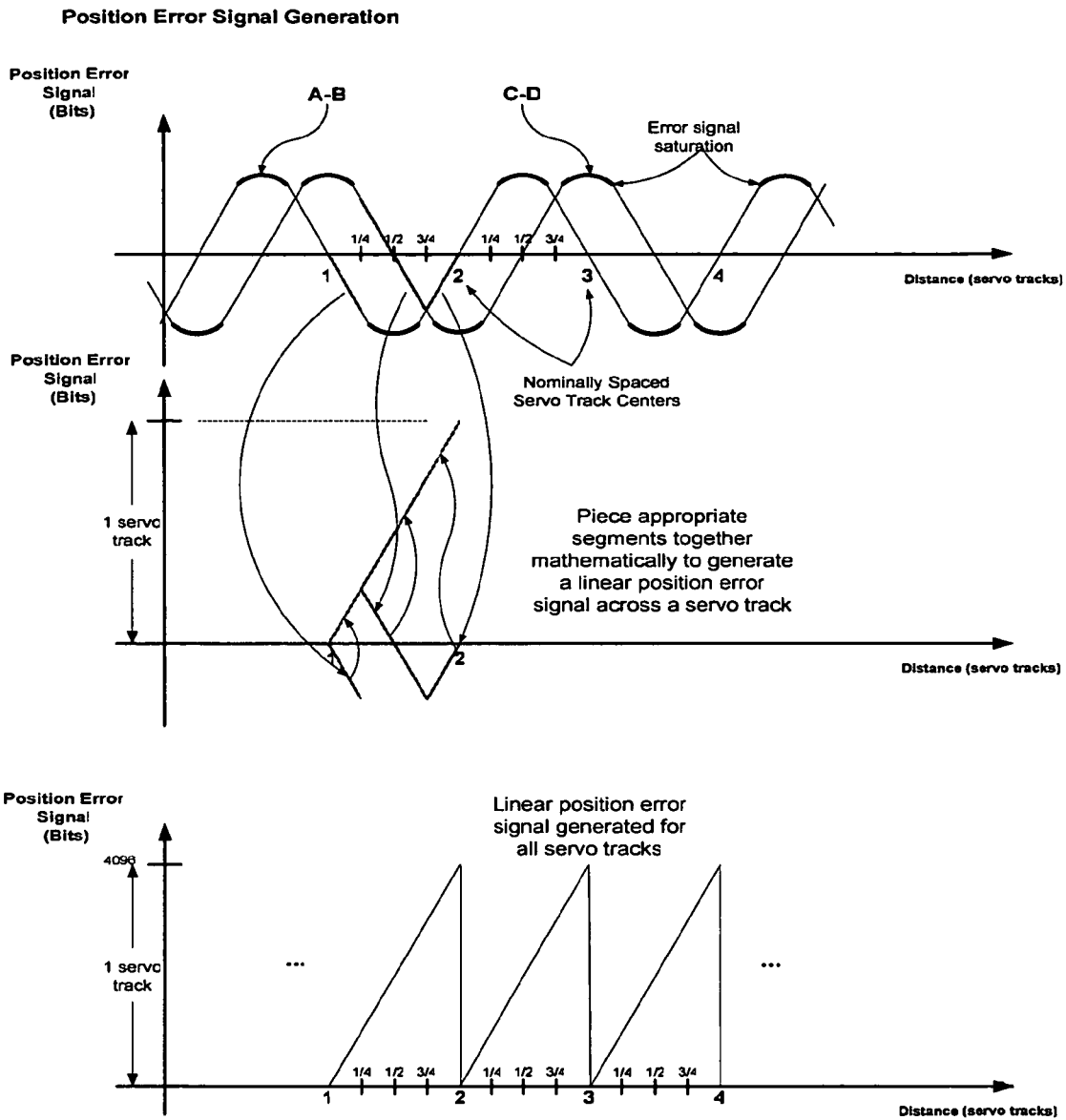
FIG. 8 illustrates the generation of a linear Position Error Signal.

By piecing the appropriate regions together, a continuously linear error signal can be mathematically developed across any servo track (refer to FIG. 8).

There are several important pieces of information in FIG. 8. The first is the odd quarter (¼ and ¾) track positions are unique in that the absolute value of A–B equals the absolute value of C–D (|A–B|=|C–D|). This fact is used to calibrate the MRW of the GMR head and will be described in detail later. The second is that A–B is linear between −¼ track to +¼ track and C–D is linear between +¼ track and +¾ track. This feature must be true for the position error signal to be linear across any given servo track as the segments are mathematically pieced together. The third is that, ideally, the position error signal for all servo tracks is the same. In reality, the MRW of the GMR heads vary head to head as well as the servo track widths. Both issues can be major sources of positioning error if not dealt with carefully.

Figure 9:
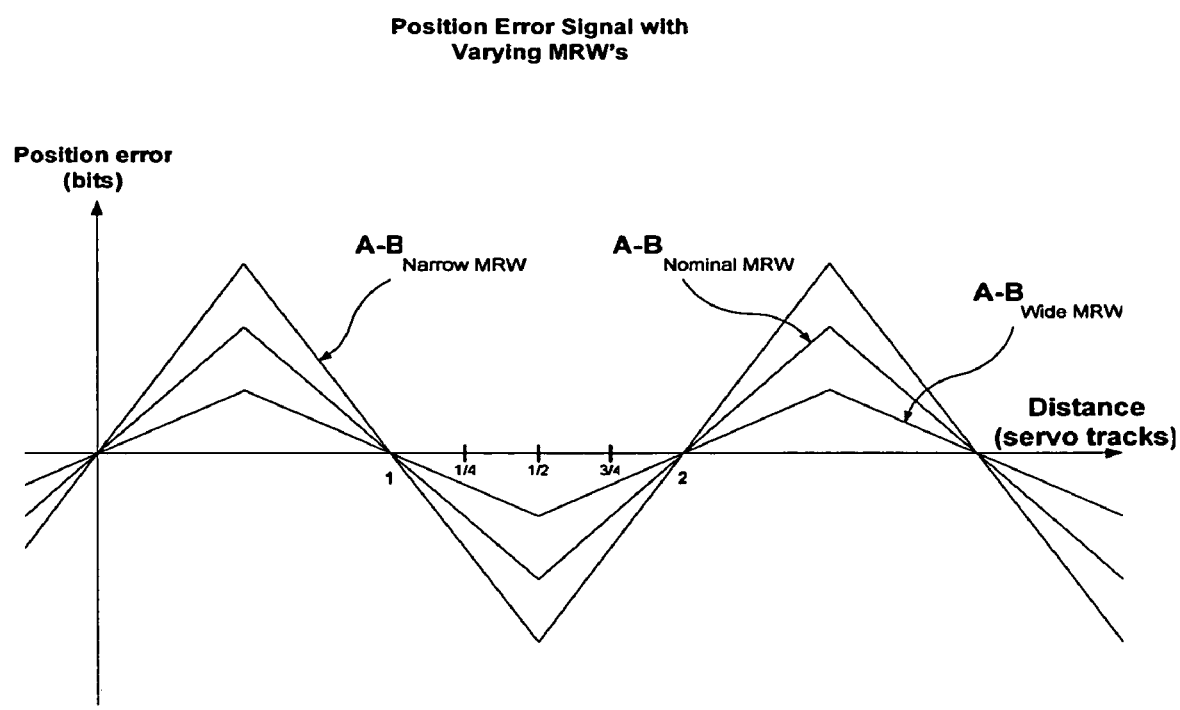
FIG. 9 shows the affect of varying magnetic read width on the Position Error Signal.

Assuming a nominal width servo track, FIG. 9 shows the affect the varying MRW has on the ideal A–B (or C–D) position error signal.

Figure 10:
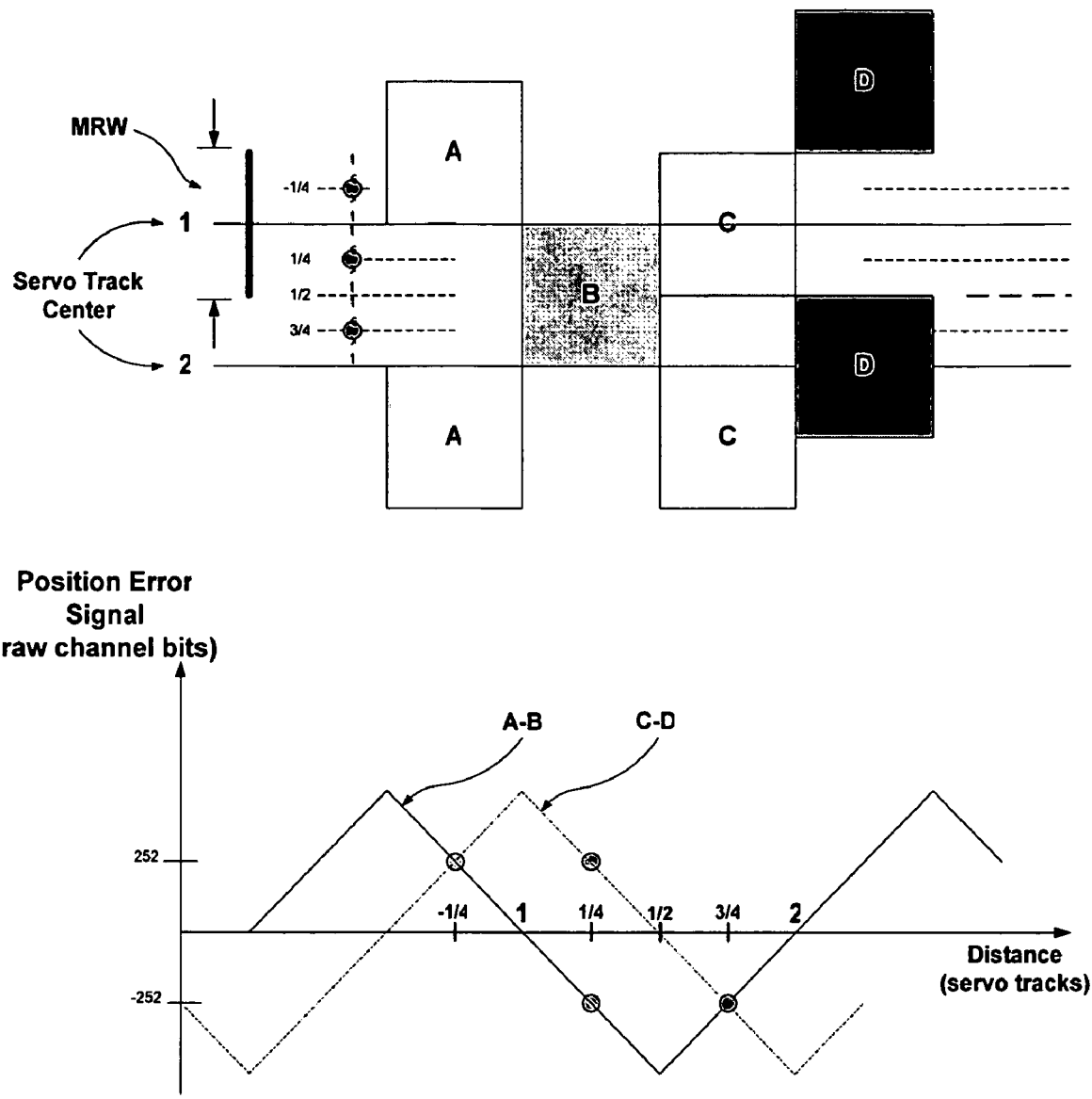
FIG. 10 illustrates the head width calibration.

In an effort to make all heads look the same, the drive code performs a "head width" calibration at power up. To measure the MRW of the GMR element, the servo system moves the head to the ¼ track and −¼ track position (refer to FIG. 10).

Notice at these two points |A–B|=|C–D|. These points are unique in that this relationship holds true regardless of the MRW. The overall goal is to have the generated position error signal represent one servo track with 4096 bits. For example, using a nominal MRW head, the |¼ track| is measured to be 252 bits. The head width calibration algorithm then scales this to the desired 4096 bits/servo track. The scale factor is known as Burst Scale Factor 1 (BSF1) and can be calculated as follows:

252 bits measured/(¼ servo track)=1008 (bits/servo track)

BSF1=4096(bits/servo track)/1008 (bits/servo track)

BSF1=4.06

Figure 11:
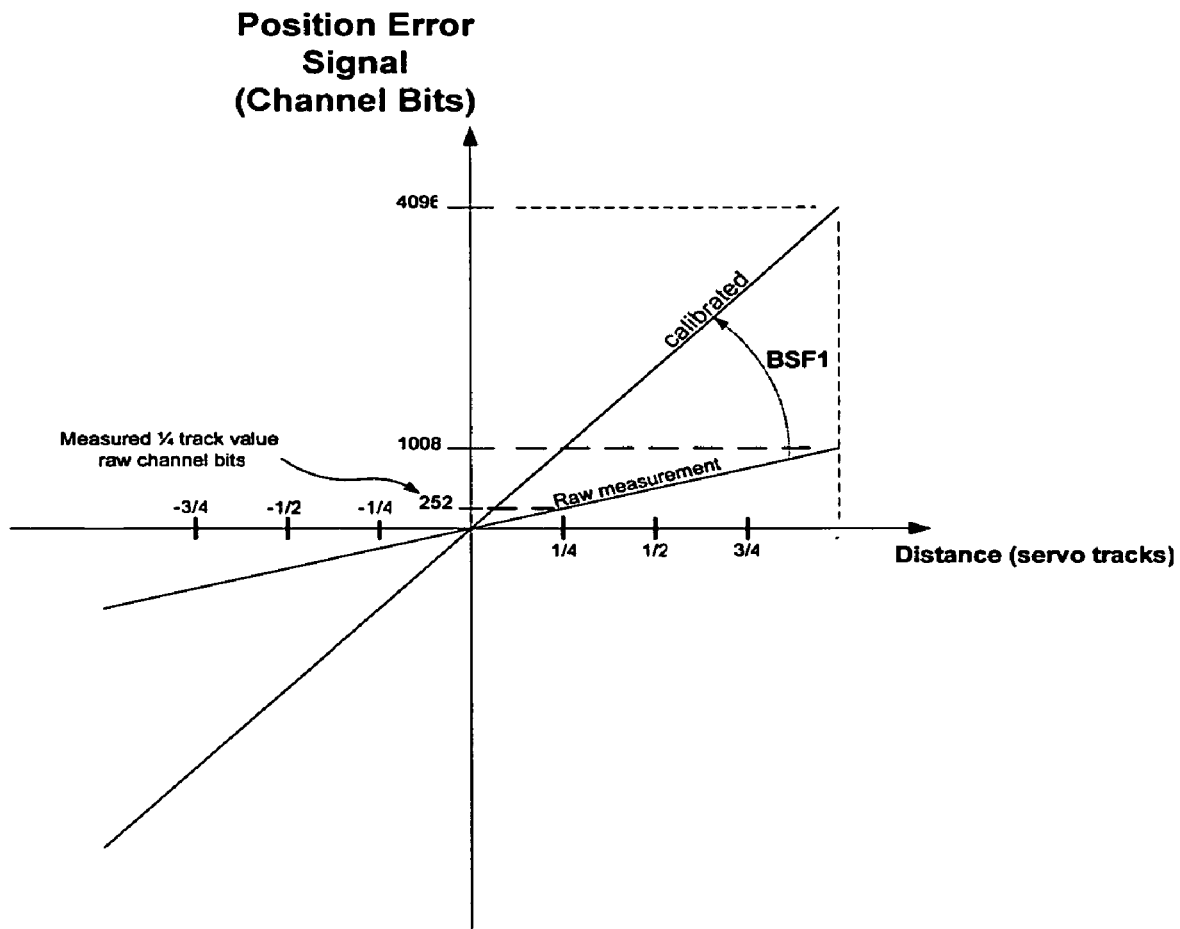
FIG. 11 illustrates the head width scaling using BSF1.

From this point forward, every position measurement made with that head is first scaled by BSF1. The answer is then referenced to 4096 to determine the fractional track position. FIG. 11 graphically shows the head width measurement on a nominal width servo track and the affect of BSF1.

As was mentioned earlier, the servo tracks are not all the same width. This fact can also produce inaccuracies in head positioning. The servo demodulation algorithm pieces the appropriate position error segments of A–B and C–D to produce a linear error signal across the disk (refer to FIG. 8). The algorithm accomplishes this by measuring the amplitudes of all the bursts (A, B, C, D) and determines the appropriate mathematical operation to develop the head position.

Figure 12:
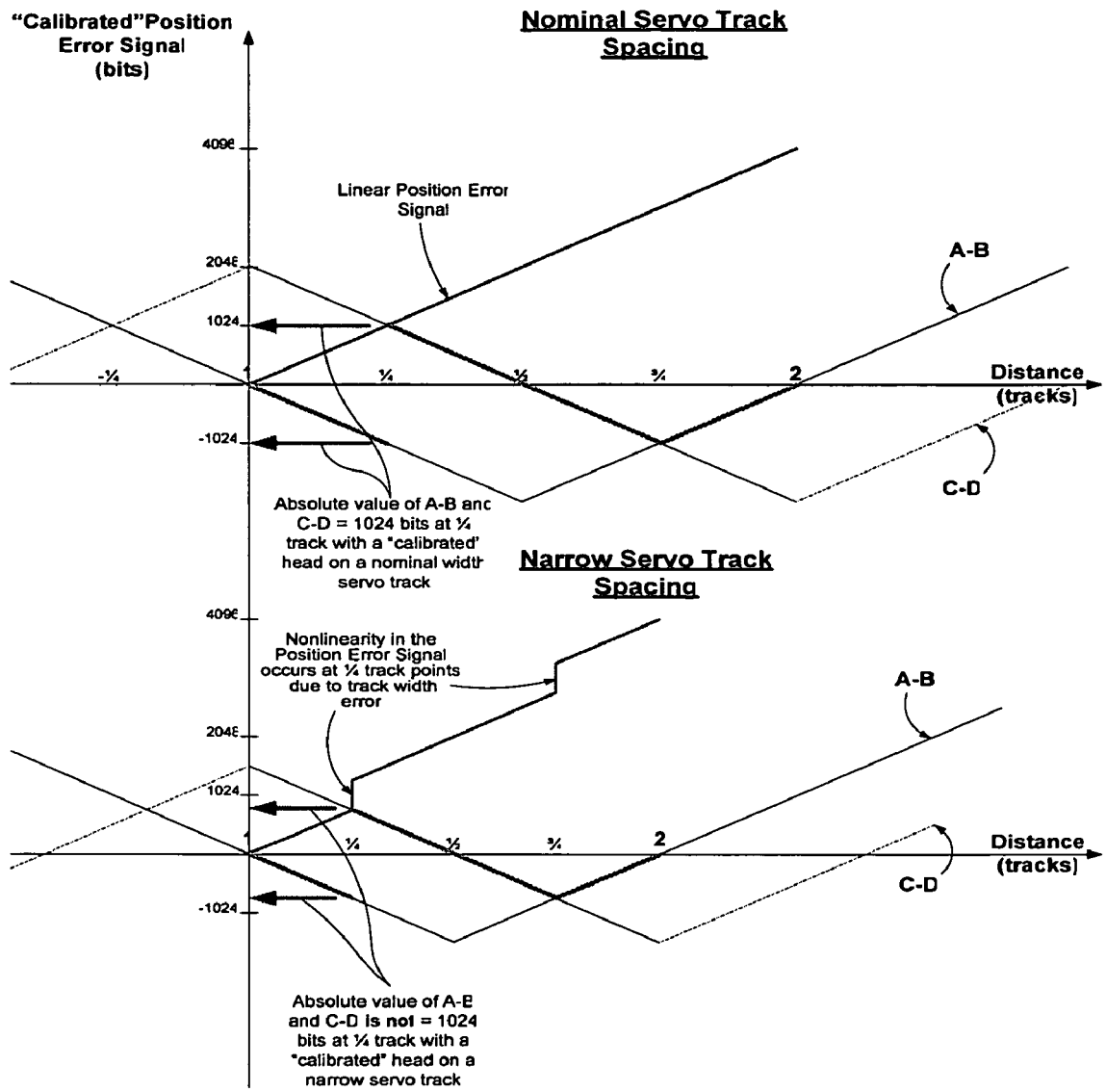
FIG. 12 shows the nonlinear position error signal on a narrow servo track.
Figure 13:
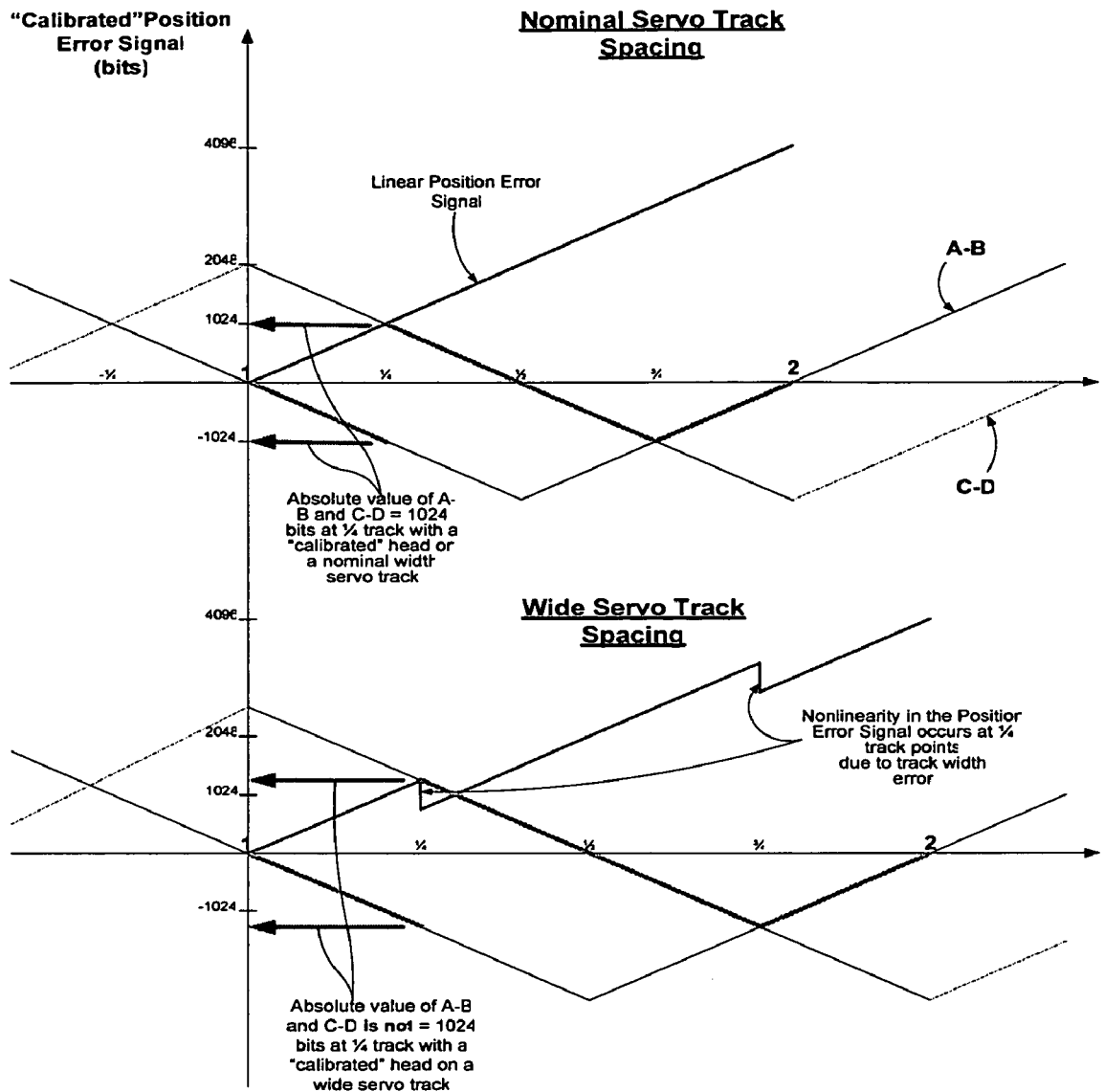
FIG. 13 shows the nonlinear position error signal on a wide servo track.

FIGS. 12 and 13 graphically show what happens to the position error signal if the head width calibration occurs on a nominal width track and is then applied to servo tracks that are narrow and wide respectively.

As seen in both figures, a discontinuity occurs at the ¼ track position. The head width calibration produces a scaling factor (BSF1) such that all nominal width servo tracks will be represented by 4096 bits/track (1024 bits/¼ tracks). In the wide or narrow servo track case, the gain of 4096 bits/servo track is not accurate. Therefore, when the demodulation algorithm blindly pieces the linear sections together, a discontinuity occurs. If the servo is commanded to position the GMR element in these regions, the head position becomes inaccurate.

The quality of the position error signal, for any given track, is dependent on reader width and servo track width. Separating the two variables can be difficult. As discussed earlier, the head width calibration makes use of the ¼ track points. When the servo tracks vary in width it makes it very difficult to accurately measure the MRW of the head. Performing the head width calibration on one random track could produce inaccurate results if that track happened to be wide or narrow. On a REV disk the average servo track width is nominal. Therefore, measuring the head width on many servo tracks (taking measurements at the ¼ track points) and averaging the results produces a very accurate measure of the MRW for a nominal width track. Unfortunately, the time to do this measurement is long and unacceptable to most operating systems. In addition, the varying servo track widths which produce nonlinear position error signals, is still a problem. The solution to both issues is a "track map".

Figure 14:
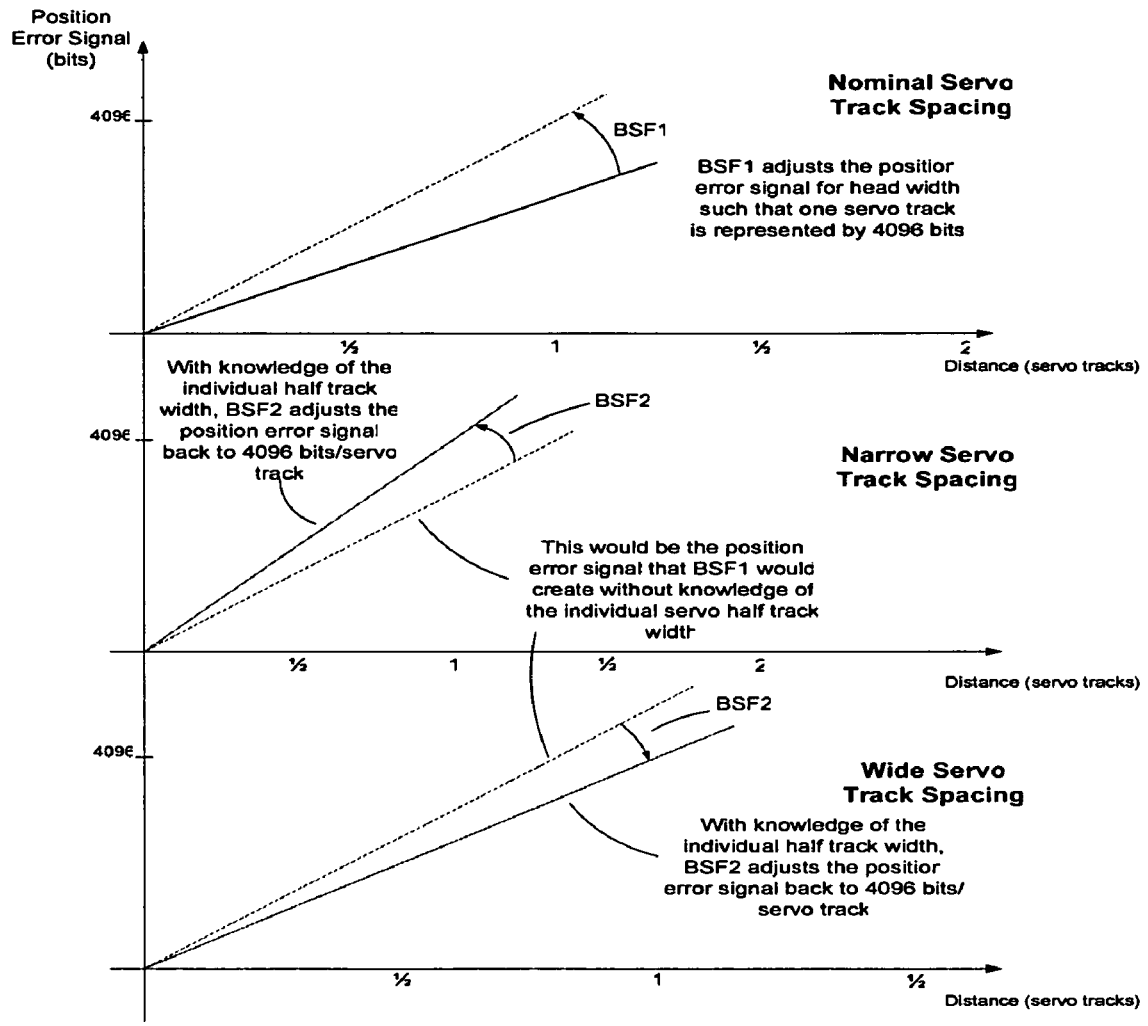
FIG. 14 illustrates the Position Error Signal gain correction using BSF2.

A track map is simply a stored measurement of the average width of every "half" servo track on a disk. The data is stored on the disk for use during drive operations. When an individual track is accessed, the appropriate servo half track width data is pulled from memory and is used to adjust BSF1 for that local half track width. The half track width data is turned into a multiplicative scalar (Burst Scale Factor 2 or BSF2) such that wide and narrow tracks are correctly represented by 4096 bits. FIG. 14 graphically shows how the servo half track data (BSF2) corrects the position error signal for a given wide or narrow track.

The method used to turn half track width data into BSF2 deserves some explanation. Recall from the head width measurement discussion above, BSF1 is a multiplicative scalar that is used to adjust the raw servo burst amplitudes (A, B, C, D) such that a nominal width track is represented by 4096 bits. FIGS. 12 and 13 show what happens to the position error signal when BSF1 is blindly applied to a wide or narrow servo track. In other words, a wide or narrow servo track cause the position error signal gain of 4096 bits/servo track to be incorrect. This can be corrected by knowing the width of a given track and making a local adjustment to BSF1.

Figure 15:
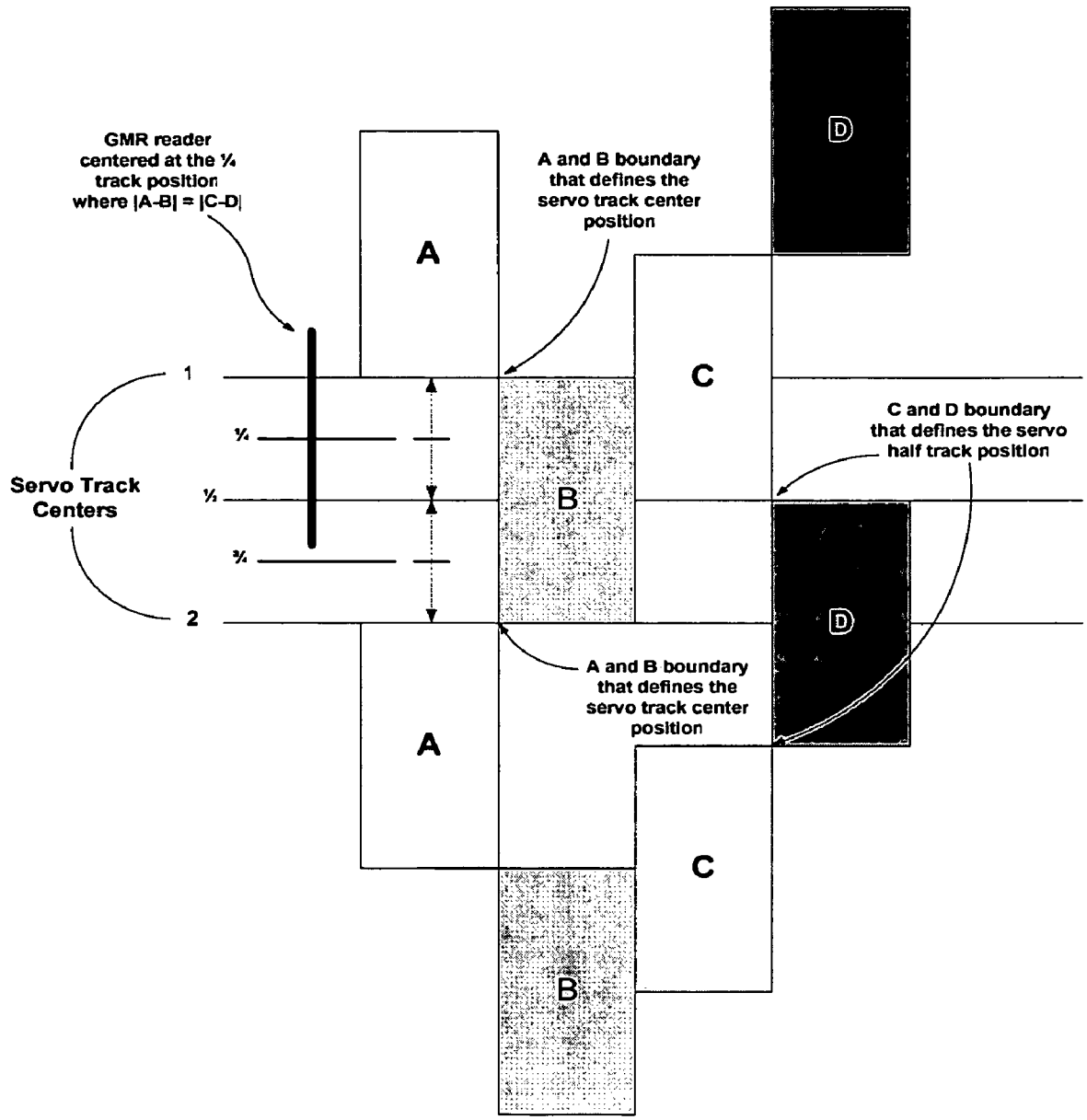
FIG. 15 shows the servo half track width measurement.

The first step in generating BSF2 is measuring the servo half track widths. This is done after an accurate head width calibration takes place. Once the head width is known, (BSF1 is calculated) the ¼ track points can be used again. Recall from the discussion above, regardless of head width, |A−B|=|C−D| at the ¼ track points. The servo system is commanded to position the head at this location. If the servo track is nominal in width, |A−B| and |C−D| (after using BSF1) will both be equal to 1024 bits (4096 bits/track/4). If the servo track is narrow, the answer will be less than 1024. If the servo track is wide the answer will be greater than 1024. Therefore, using the measurement of |A−B| and |C−D| at the ¼ track, the half track width can be calculated as follows: ½ servo track width=|A−B|+|C−D|. The half servo track width is measured because the ¼ track point defined by |A−B|=|C−D| divides the distance between the A and B burst boundary, which defines the track center, and the C and D burst boundary, which defines the half servo track position. FIG. 15 graphically shows this relationship.

To scale wide or narrow servo tracks to the nominal 4096 bits/track, BSF2 needs to be an inverse multiplicative scalar. For example, on a narrow track, the ½ track measurement could be equal to 1966. To scale the position error signal back to 4096 bits/track (2048 bits/½ track), BSF2 =2048/1966. Again, BSF2 is the multiplicative factor necessary to adjust the measured Position Error Signal (PES) to an overall gain of 4096 bits/servo track (BSF2 would equal 1 (2048/2048) for a nominal width half servo track. BSF2 will be >1 for a narrow half track and BSF2 will be <1 for a wide half track).

The final detail is deciding what half track measurement to use in calculating BSF2 for cases when the head is positioned on the half track boundaries. In these cases it was decided to average the adjacent half track widths and calculate BSF2. This BSF2 value is used any time the servo system is commanded to position the head within +/− 5% of the desired half track boundary. FIG. 16 graphically shows an example of different BSF2 values for a series of half tracks highlighting the boundary issue. The second diagram in FIG. 16 shows the solution to the half track boundary case.

Figure 17:
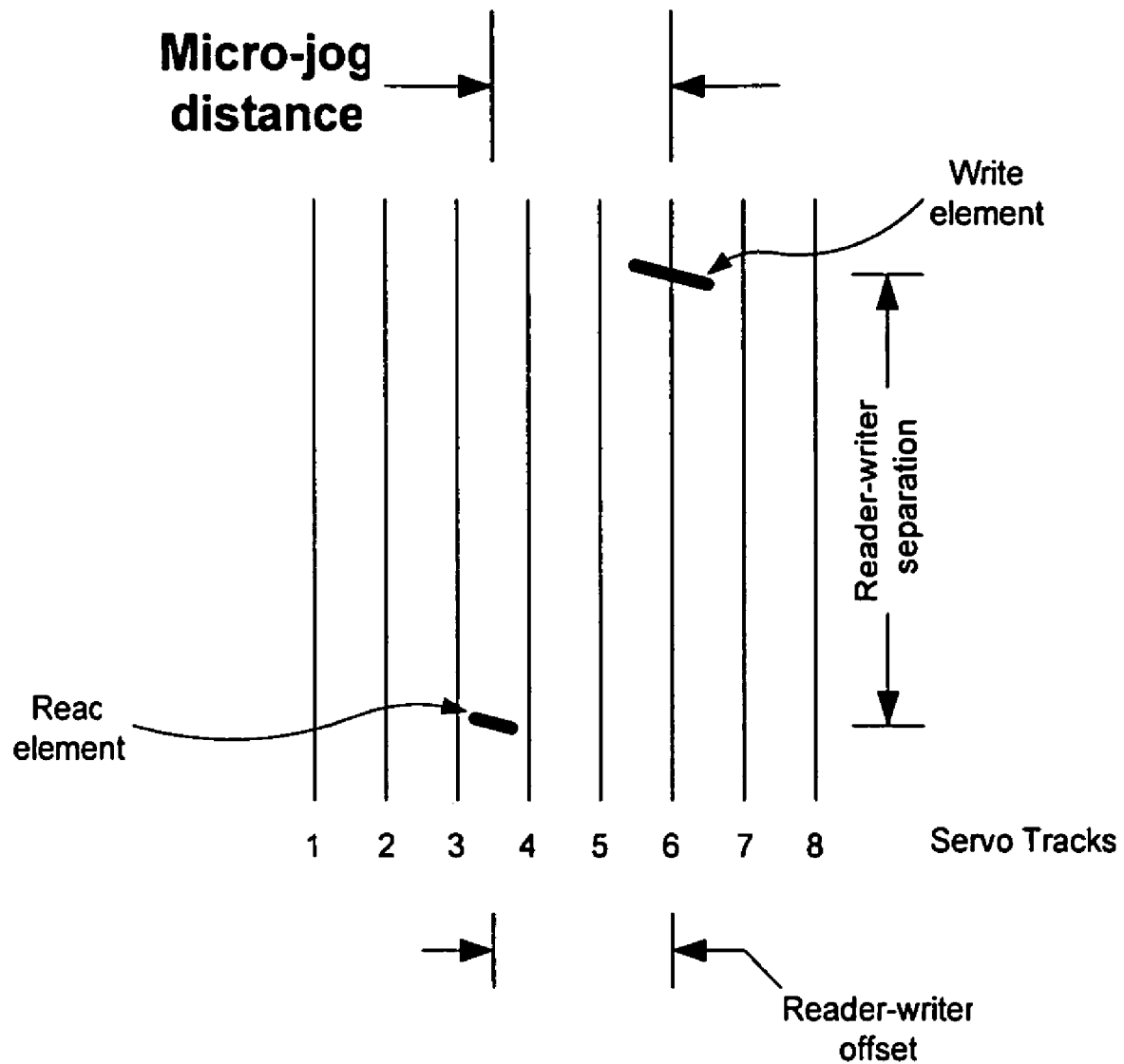
FIG. 17 illustrates the microjog distance between the reader and writer.

As described earlier, removability requires the REV drive to write data down the data track center. Due to the reader/writer separation and offset, positioning the writer over each data track requires a unique reader position. At disk insertion, the drive runs a calibration routine that determines the individual reader /writer relationship. Using this information coupled with the drive geometry, the reader position for any data track can be calculated. This distance is known as the micro-jog distance (refer to FIG. 17).

The micro-jog distance is the physical distance away from the data track center the reader must be positioned such that the writer is positioned directly over the data track. The micro-jog distance is measured in servo tracks. Servo tracks are the only measure of distance in the drive and ideally the servo tracks are written at a precise spacing. In reality the servo track spacing is not ideal, so the ability to accurately place the writer on the data track center is degraded. As stated earlier, positioning errors can cause data encroachment during write operations as well as reduced data throughput during read operations.

As described above, a linear position error signal is created over varying servo track widths. The result is that all servo tracks, regardless of width, are represented by 4096 bits. A servo command to position the reader ½ tracks away from center would result in an offset of 2048 bits. The distance the head moves will be ½ of the adjacent track, but the actual physical distance moved depends on the true half track width. The micro-jog distance is a physical distance determined by the reader/writer relationship modified by the geometry of the drive (actuator/head assembly moving in an arc). As an example, consider the case where the micro-jog distance of ½ a "nominal" servo track is required to place the writer over a data track center. If the adjacent half track is not nominal in width, but wide or narrow, blindly moving the reader to the adjacent half track position will not place the write element over the data track center (refer to FIG. 18).

The solution to this problem is contained in the track map. The track map is a measurement of all half track widths on the disk. Thus, the micro-jog distance for any data track can be adjusted to more accurately position the write element. FIG. 19 graphically shows the micro-jog distance correction for the local half track width dimensions. Obviously, as the micro-jog distance increases spanning multiple half tracks, the potential for positioning errors increases. Therefore, the use of the track map becomes more important in new products where the track pitch is expected to increase.

Figure 1:
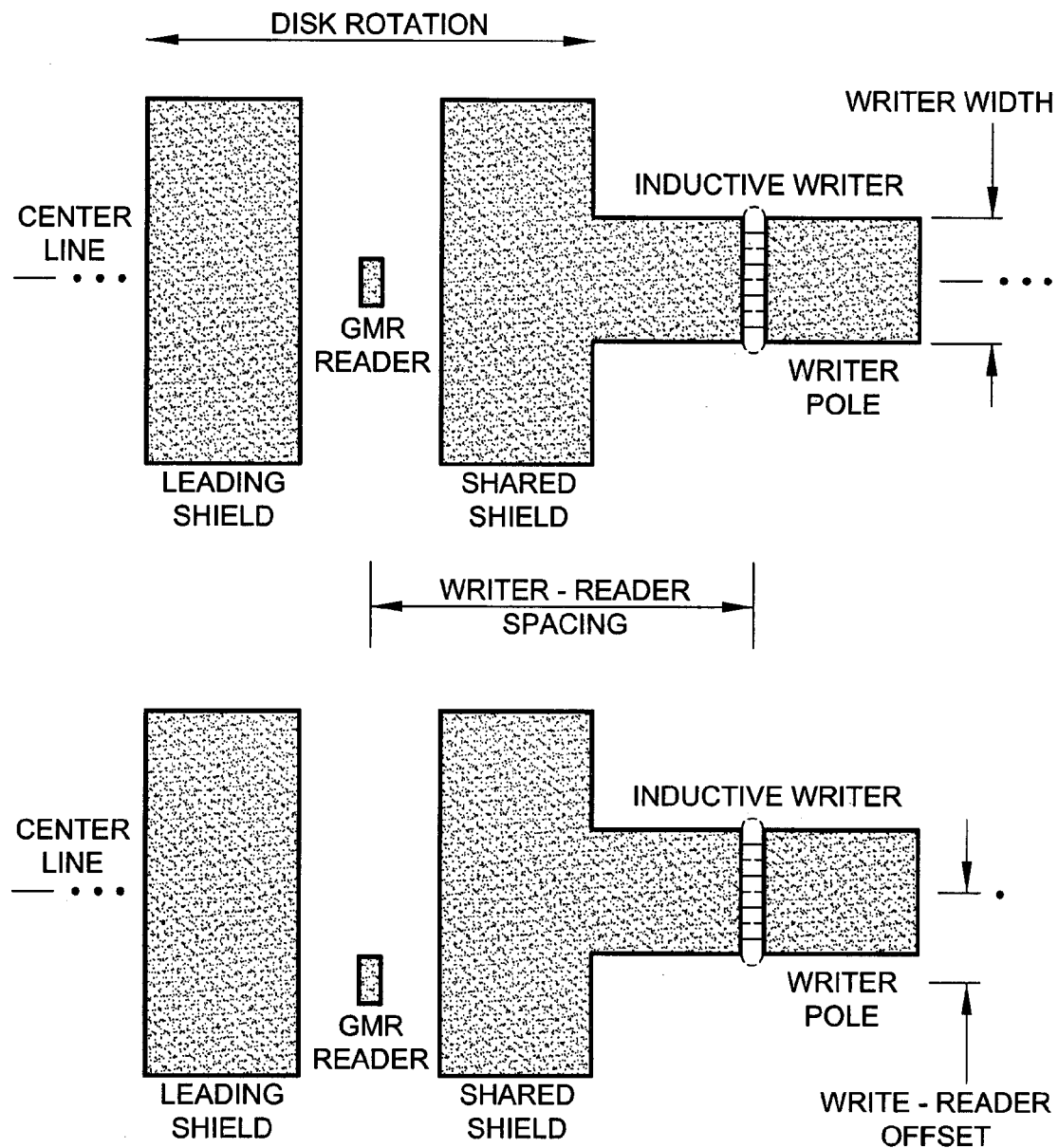
FIG. 1 dual element heads used in a typical prior art hard drive.
Figure 2:
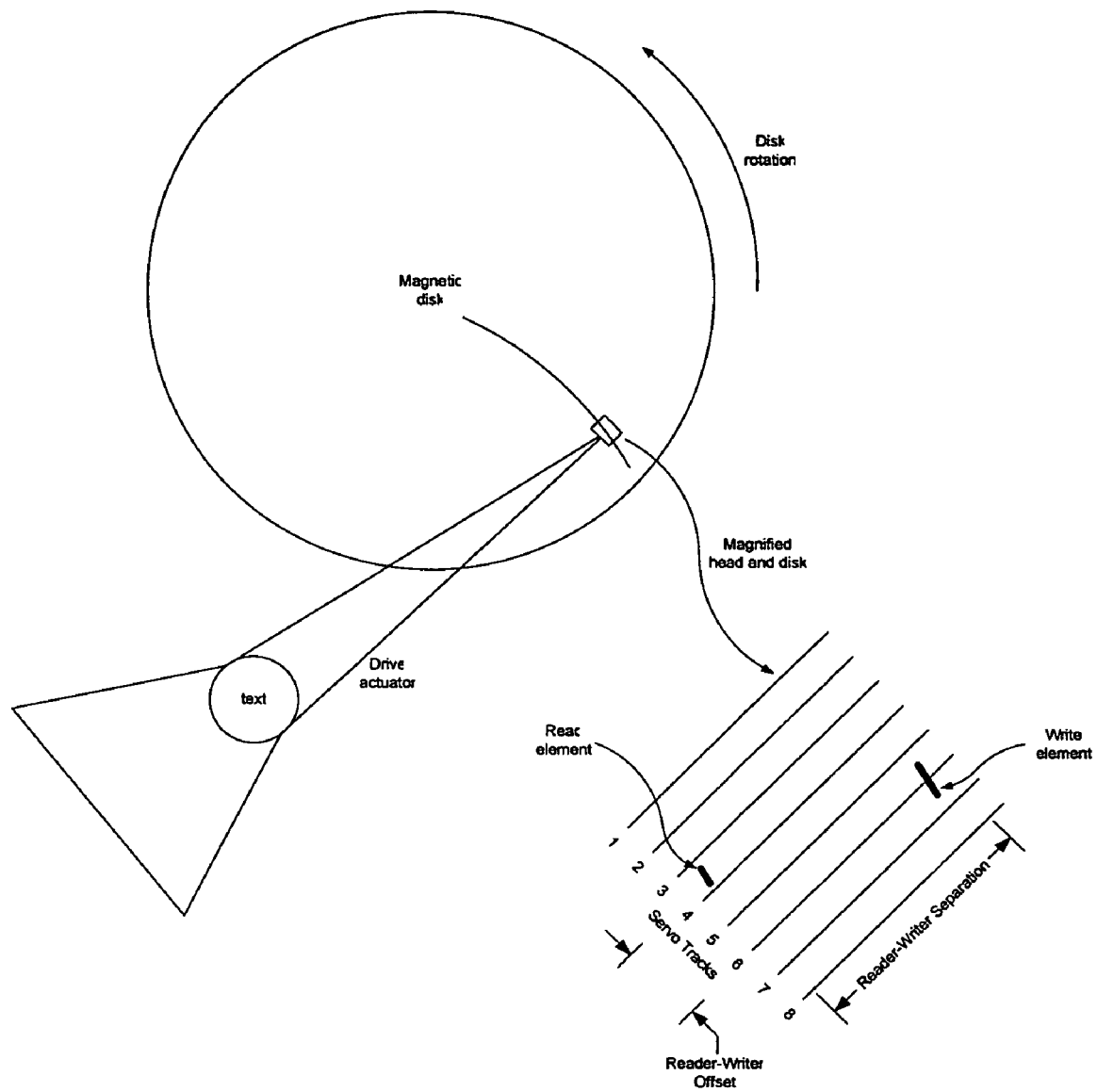
FIG. 2 shows a prior art GMR reader and inductive writer separation and offset.
Figure 3:
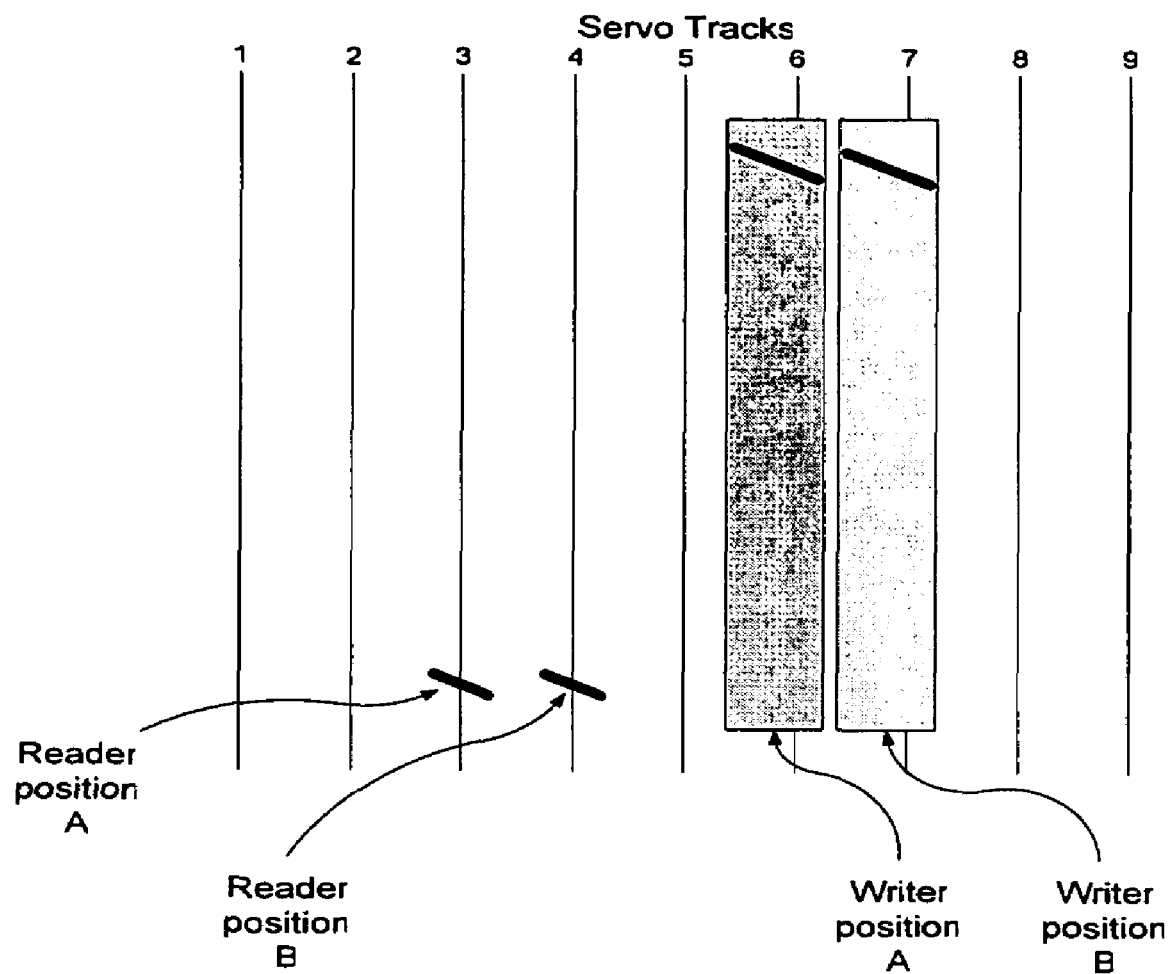
FIG. 3 shows evenly spaced servo tracks on a prior art hard drive.
Figure 4:
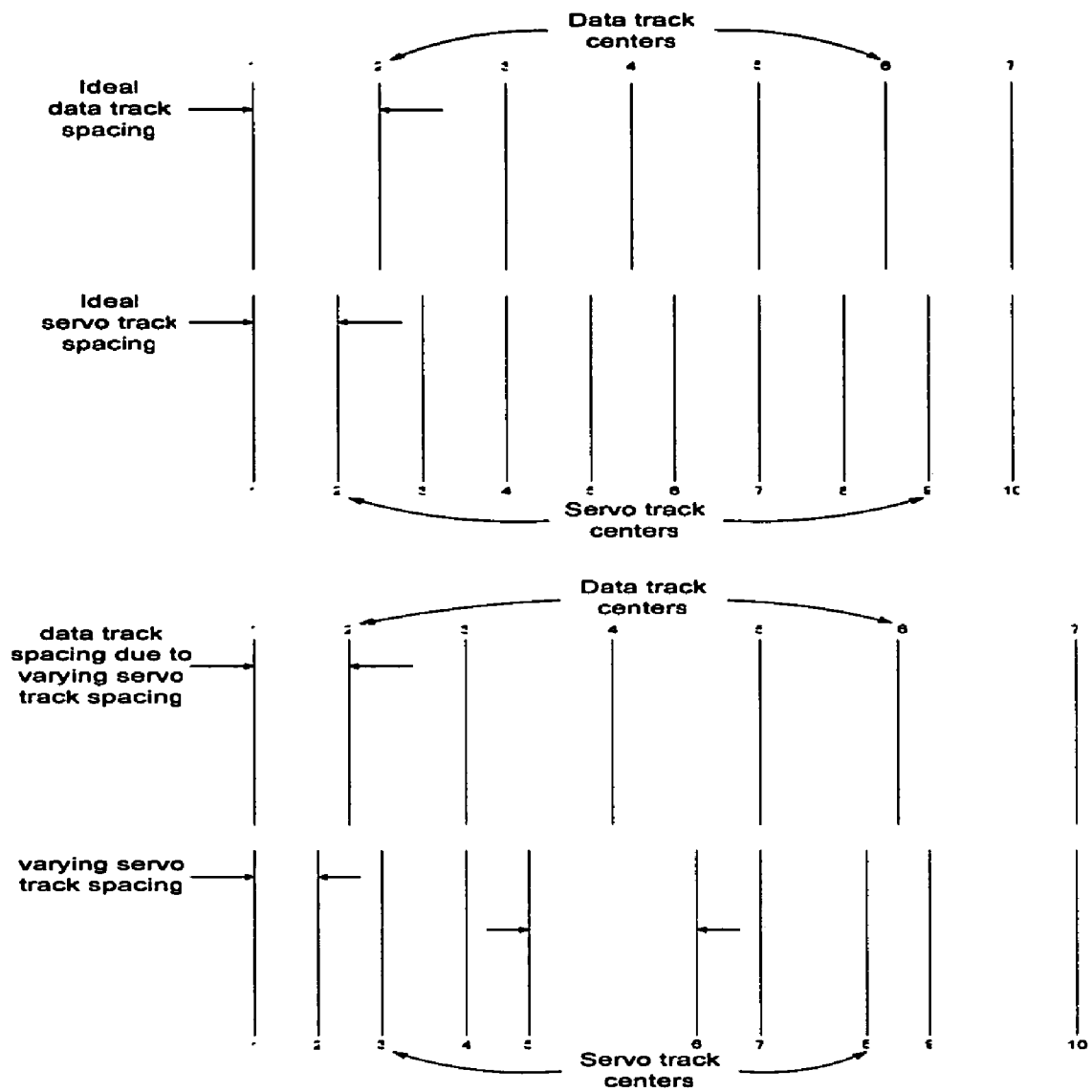
FIG. 4 illustrates a typical prior art track layout.

The data track layout is based on the servo track spacing. As can be seen in FIG. 4, if the servo track spacing is not correct, the data track spacing is also incorrect. If several adjacent servo tracks are narrow, the corresponding data tracks are also squeezed together. This is one cause of data encroachment.

The solution to this problem is also the track map. With specific knowledge of the servo track spacing, the drive code could easily be designed to place the data tracks at whatever spacing is desired (refer to FIG. 20). This feature has several advantages. Presently, all servo half track widths on all cartridges are measured. If adjacent servo half tracks are too narrow, the corresponding data tracks are deleted from customer use. If too many of these areas are found, the entire cartridge is failed. The sensitivity to this issue is decreased by using the track map to place the data tracks at the desired spacing. Another advantage comes from improving the soft error rate (correctable data errors). The drive soft error rate is used in the factory as a metric to pass or fail drives. The soft error rate can be affected by many drive parameters. Data encroachment is one of those variables, so any improvement in this area can directly affect factory drive yields.

Numerous variations and modifications of the invention will become readily apparent to those skilled in the art. Accordingly, the invention may be embodied in other specific forms without departing from its spirit or essential characteristics.

What is claimed is:

1. A method for compensating for variable servo track width in an information storage disk comprising:
   creating a track map of the storage disk,
   wherein the track map includes a stored determination of an average width of every half servo track on the information storage disk;
   adjusting a scale factor, which is a BSF1 ("Burst Scale Factor 1"), for a servo track width based on the track map; and
   calculating a multiplicative scale factor BSF2 ("Burst Scale Factor 2") such that the servo track width is represented by 4096 bits.

2. The method of claim 1, further comprising correcting a position error signal for the servo track width based on the scale factor.

3. The method of claim 1, wherein BSF2 is greater than one for a narrow track and less than one for a wide track.

4. The method of claim 1, further comprising computing an average of the widths of adjacent half track to apply to a window of positions including the boundary between the adjacent half tracks.

5. The method of claim 4, wherein the window includes positions within a positive and negative 5% range of the boundary between the adjacent half tracks.

6. An information storage system comprising:
   information storage media having a plurality of servo tracks; and
   a track map defining a location for each of the plurality of servo tracks,
   wherein the track map is stored on the information storage media,
   wherein the track map includes a stored determination of an average width of every half servo track of the information storage media, and
   wherein a scale factor, which is a BSF1 ("Burst Scale Factor 1"), is adjusted for a servo track width based on the track map and a multiplicative scale factor BSF2 ("Burst Scale Factor 2") is calculated such that the servo track width is represented by 4096 bits.

7. The information storage system of claim 6, further comprising:
   a drive containing an actuator and read/write heads; and
   a removable cartridge containing the information storage media.

8. The information storage system of claim 6, wherein the track map is used to compensate for variable track width.

9. The information storage system of claim 8, wherein the track map is used to create a scale factor to adjust for the variable track width.

10. The information storage system of claim 6, wherein the track map is used to compensate for variations in microjog distance.

11. The information storage system of claim 10, wherein the track map is used to adjust the microjog distance based on track width to position a write element.

12. The information storage system of claim 11, wherein the track map is used to place data tracks at a desired spacing.

13. The information storage system of claim 6, wherein the track map is used to compensate for variations in servo track spacing.

14. The information storage system of claim 6, wherein BSF2 is greater than one for a narrow track and less than one for a wide track.

15. A method of creating a track map for a data storage system comprising:
   measuring the half servo track widths on an information storage media,
   wherein the information storage media includes a plurality of servo tracks, and
   wherein a half servo track width is determined for every half servo track;
   storing the half servo track widths in a track map on the information storage media;
   adjusting a scale factor, which is a BSF1 ("Burst Scale Factor 1"), for a servo track width based on the track map; and
   calculating a multiplicative scale factor BSF2 ("Burst Scale Factor 2") such that the servo track width is represented by 4096 bits.

16. The method of claim 15, further comprising compensating for variable track width using the track map.

17. The method of claim 15, further comprising compensating for microjog distance using the track map.

18. The method of claim 15, further comprising compensating for servo track spacing using the track map.

19. The method of claim 15, wherein the information storage media is housed in a removable data cartridge.

20. The method of claim 15, wherein BSF2 is greater than one for a narrow track and less than one for a wide track.

* * * * *